No. 812,280. PATENTED FEB. 13, 1906.
G. P. LOUISO & C. H. HENSLEY.
COMPUTING CHEESE CUTTER.
APPLICATION FILED APR. 14, 1905.

2 SHEETS—SHEET 2.

Witnesses
Adelaide Keane
J. A. Walsh

Inventors
George P. Louiso
Charley H. Hensley
By Bradford Hood Attorneys

UNITED STATES PATENT OFFICE.

GEORGE P. LOUISO AND CHARLEY H. HENSLEY, OF ANDERSON, INDIANA, ASSIGNORS OF ONE-THIRD TO SAID LOUISO AND TWO-THIRDS TO JESSE L. VERMILLION, OF ANDERSON, INDIANA.

COMPUTING CHEESE-CUTTER.

No. 812,280. Specification of Letters Patent. Patented Feb. 13, 1906.

Application filed April 14, 1905. Serial No. 255,640.

*To all whom it may concern:*

Be it known that we, GEORGE P. LOUISO and CHARLEY H. HENSLEY, citizens of the United States, residing at Anderson, in the county of Madison and State of Indiana, have invented certain new and useful Improvements in Computing Cheese-Cutters, of which the following is a specification.

The object of our invention is to produce a cheese-cutter in which the means for moving the cheese-carrying table shall be very simple and cheap, but yet of such character as to produce substantial accuracy of operation.

The accompanying drawings illustrate our invention.

Figure 1:
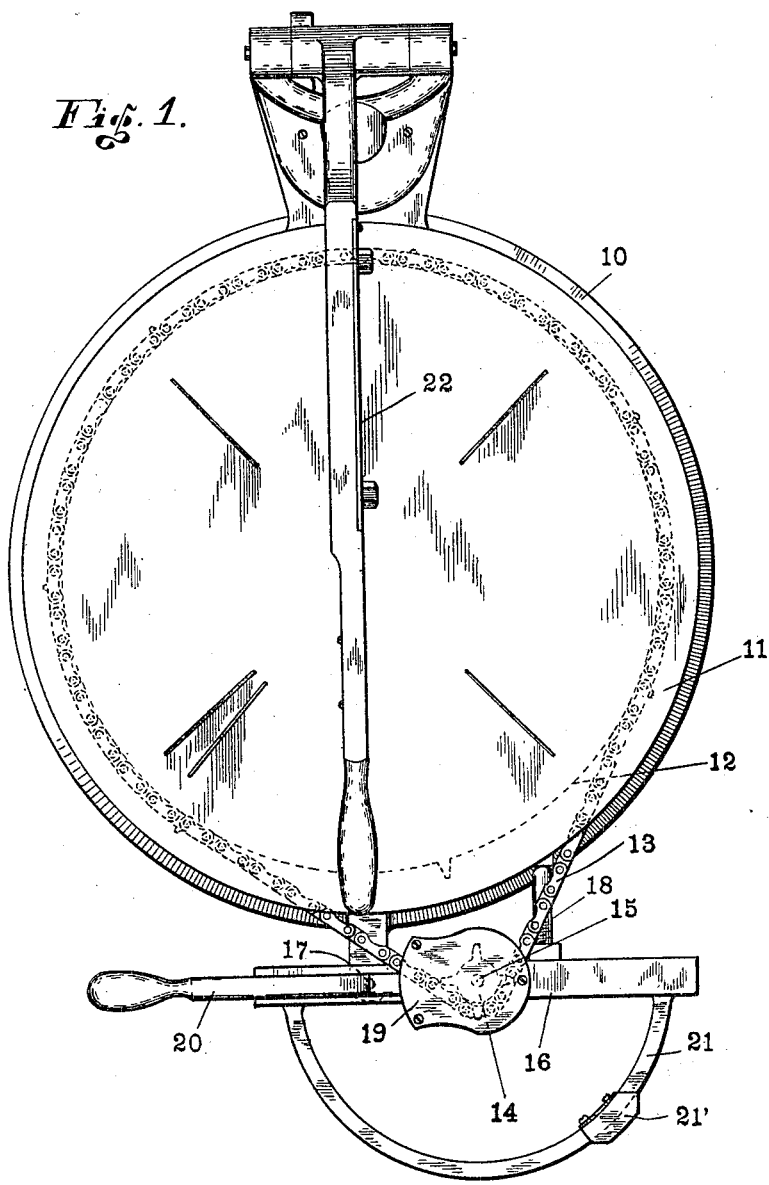
Figure 2:
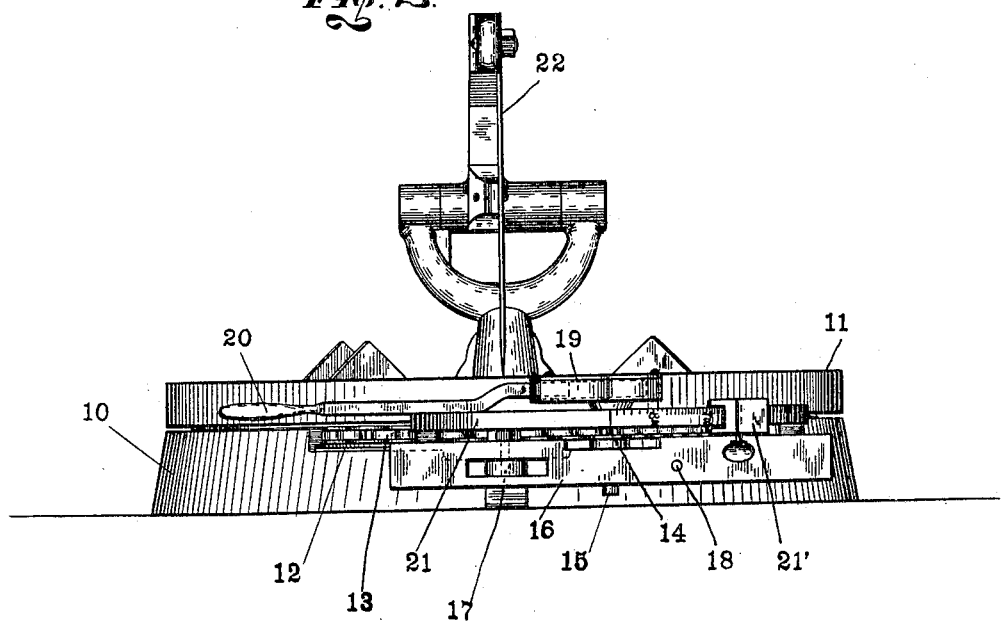

Figure 1 is a plan, and Fig. 2 an elevation.

In the drawings, 10 indicates a suitable supporting-base, upon which is pivoted a horizontally-rotatable cheese-carrying table 11. The table is provided on its under face with a sprocket-wheel 12, from which runs an endless sprocket-chain 13. The chain 13 also runs over a small pinion 14, by means of which the chain 13 is driven. Pinion 14 is carried by a shaft 15, which is journaled in the carrier 16, pivoted at 17 to the base 10. An adjusting-screw 18 is threaded through the free end of the carrier 16 and engages the base 10 in order that by swinging the carrier 16 upon its pivot all slack in the chain 13 may be taken up, so as to prevent any possibility of backlash in the table-driving means. Journaled on the shaft 15 is any suitable ratchet or friction drive mechanism 19, provided with an operating member 20, the construction thereof being such that it will serve to drive the shaft 15 in one direction only.

Any suitable means may be provided to serve as a gage to indicate the amount of movement of the shaft 15—as, for instance, an arc-bar 21, attached to the carrier 16, said arc-bar or other gage being provided with suitable graduations to indicate the amount of movement. We prefer to attach the arc-bar to the carrier 16 in order that adjustment of this carrier will not vary the accuracy of the graduations. The arc-bar 21 will be provided with any suitable scale, as indicated in Fig. 2, to indicate the necessary position of the stop 21' thereon in order that a single throw of the operating-handle 20 will produce a sufficient movement of the table 11 to pass beneath the knife 22 a wedge of cheese of a given value—for instance, five cents worth—the amount of movement of the table being dependent upon the throw of the lever 20 and of course varying in an inverse ratio to the total value of the cheese.

We claim as our invention—

1. In a cheese-cutter, the combination with the base, of a cheese-carrying table rotatably mounted thereon, an operating-shaft arranged substantially parallel with the axis of the table, a chain-engaging member carried by said shaft, a chain-engaging member carried by the table, an endless chain passing around the said two members, means for keeping said chain tight to prevent independent movement of the table, and an operating member adapted to drive the shaft and chain in one direction only.

2. In a cheese-cutter, the combination with a base and a knife carried thereby, of a cheese-carrying table rotatably mounted on said base in position to coöperate with said knife, a shaft-carrier movably mounted on said base, an operating-shaft journaled in said carrier, an endless belt passing around said shaft and said table to drive the table, means for adjusting the shaft-carrier so as to vary the distance between the axis of the table and said shaft whereby the belt may be held tight to prevent independent movement of the table, and means for driving said shaft and chain in one direction only.

3. In a cheese-cutter, the combination with a base and a knife carried thereby, of a cheese-carrying table rotatably mounted on said base in position to coöperate with said knife, a shaft-carrier movably mounted on said base, an operating-shaft journaled in said carrier, an endless belt passing around said shaft and said table to drive the table, means for adjusting the shaft-carrier so as to vary the distance between the axis of the table and said shaft whereby the belt may be held tight to prevent independent movement of the table, a single-acting clutch-driving connection adapted to engage said shaft to drive the same in one direction only, and an indicator-bar carried by the shaft-carrier in conjunction with said clutch-driver.

4. In a cheese-cutter, the combination with a base, of a rotatable cheese-carrying table mounted thereon, a shaft-carrier movably mounted on said base, a shaft journaled in said carrier substantially parallel with the axis of the table, an endless belt passing around said table and said shaft, means for driving the shaft, and means for adjusting the shaft-carrier on the base, for the purpose set forth.

5. In a cheese-cutter, the combination with a base, of a rotatable cheese-carrying table mounted thereon, a shaft-carrier movably mounted on said base, a shaft journaled in said carrier substantially parallel with the axis of the table, an endless belt passing around said table and said shaft, means for driving the shaft, means for adjusting the shaft-carrier on the base, an indicator-bar mounted on the shaft-carrier to move therewith and arranged in conjunction with the shaft-operating means to indicate the amount of movement thereof.

In witness whereof we have hereunto set our hands and seals, at Anderson, Indiana, this 13th day of January, A. D. 1905.

GEORGE P. LOUISO. [L. S.]
CHARLEY H. HENSLEY. [L. S.]

Witnesses:
S. A. CULVER,
R. L. MICHELS